United States Patent [19]

Colgate

[11] 4,028,179
[45] June 7, 1977

[54] NUCLEAR REACTOR CORE SAFETY DEVICE

[76] Inventor: Stirling A. Colgate, 4616 Ridgeway Ave., Los Alamos, N. Mex. 87544

[22] Filed: Jan. 22, 1976

[21] Appl. No.: 651,514

[52] U.S. Cl. ............................. 176/38; 176/20 R; 176/68; 176/69; 176/79; 176/82; 176/87
[51] Int. Cl.² ........................................ G21C 9/00
[58] Field of Search .................. 176/69, 71, 68, 70, 176/79, 89, 91 R, 87, 82; 252/301.1 R

[56] References Cited

UNITED STATES PATENTS

| 3,118,819 | 1/1964 | Alfille et al. | 176/79 |
| 3,157,580 | 11/1964 | Williams | 176/68 |
| 3,663,182 | 5/1972 | Hamling | 23/355 |
| 3,728,421 | 4/1973 | Noothout | 264/.5 |
| 3,762,995 | 10/1973 | Gulbransen et al. | 176/68 |
| 3,798,123 | 3/1974 | Lindemer | 176/67 |
| 3,799,790 | 3/1974 | Schulz et al. | 117/37 R |
| 3,856,622 | 12/1974 | Pollock et al. | 176/68 |
| 3,886,037 | 5/1975 | Schlenker | 176/68 |

FOREIGN PATENTS OR APPLICATIONS 609,952 10/1960 Italy .................................. 176/68

*Primary Examiner*—Stephen C. Bentley
*Assistant Examiner*—Ralph Palo
*Attorney, Agent, or Firm*—Brumbaugh, Graves, Donohue & Raymond

[57] ABSTRACT

The danger of a steam explosion from a nuclear reactor core melt-down can be greatly reduced by adding a gasifying agent to the fuel that releases a large amount of gas at a predetermined pre-melt-down temperature that ruptures the bottom end of the fuel rod and blows the finely divided fuel into a residual coolant bath at the bottom of the reactor. This residual bath should be equipped with a secondary cooling loop.

15 Claims, 1 Drawing Figure

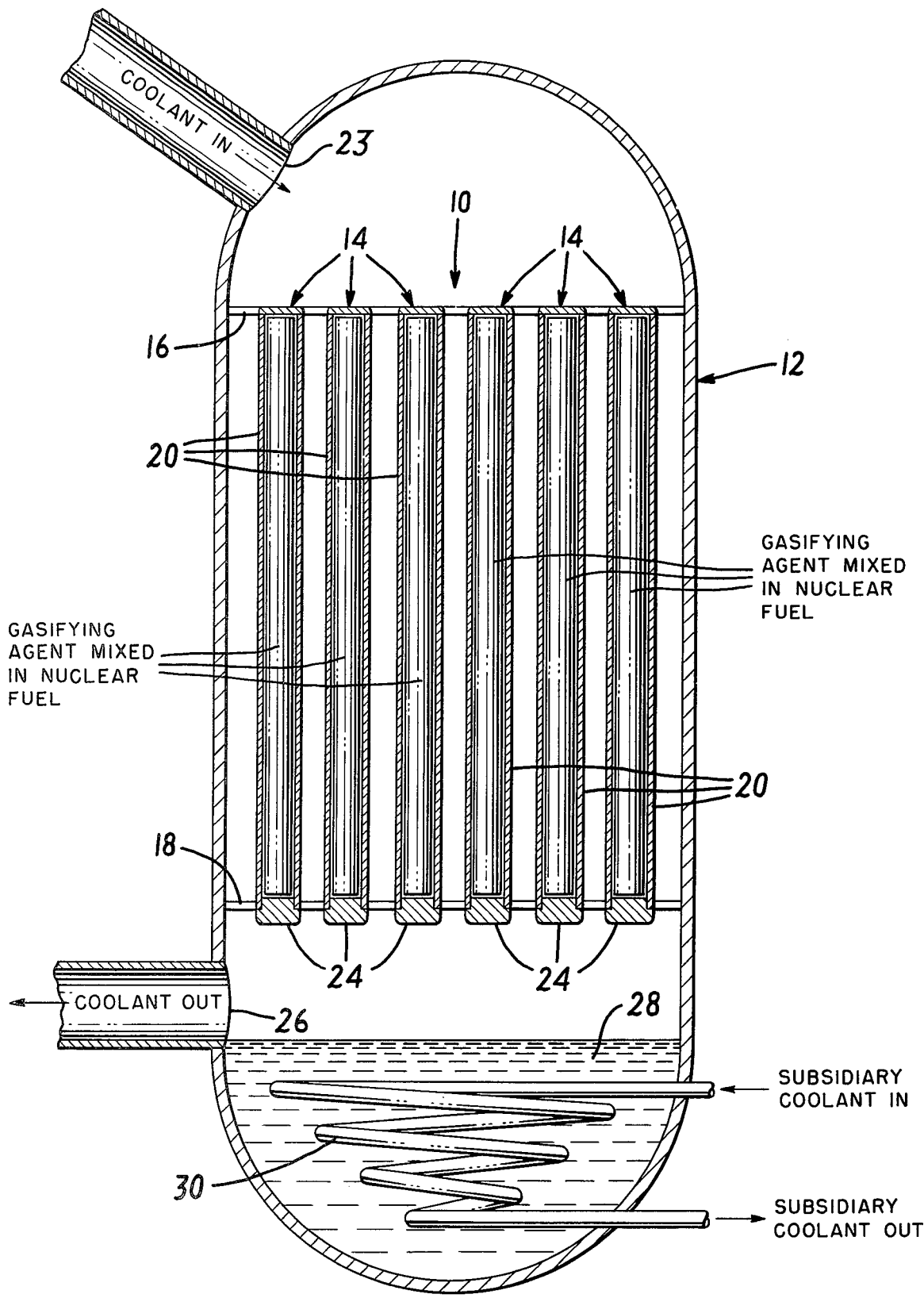

NUCLEAR REACTOR CORE SAFETY DEVICE

BACKGROUND OF THE INVENTION

Fluid-fluid explosive self-mixing, sometimes referred to as "steam "explosions in the particular circumstances where water is involved, is a common and well known hazard and phenomenon in industry, particularly the foundry industry. Such an explosion can occur, for example, when a hot molten metal falls into a bath of water or on damp earth. The violence of these explosions can be major. In the aluminum industry there have been accidents where more than 100 workmen have been killed and a whole foundry destroyed.

Such explosions are caused primarily by bringing a hot fluid — e.g., hot molten metal, salt, or glass — into sudden and close contact with a cold vaporizable fluid — e.g., water, industrial solvents, or heat transfer fluids — that have a high vapor pressure, say on the order of hundreds of atmospheres, when they are at the temperature of the hot fluid. Under these circumstances, an explosion frequently occurs if some kind of trigger pressure pulse forces the fluids into contact with one another. However, the explosion may not need to be triggered in all cases. In other instances, minor triggers — e.g., delayed supercritical boiling, mechanical motion, and even bubbles of one fluid trapped by the other in the bottom of a container — may cause the explosion. At any rate, once a rapid mixing begins, it is likely to continue until a fair fraction of the two fluids have exchanged almost all their heat and energy. Apparently, the mixing is self driven, and fluid instabilities allow one fluid to mix into the other in extremely small particles, as small as a micron in size, so that the heat exchange occurs in milliseconds or less time. The pressure of the explosion is limited by the vapor or "steam " pressure at the temperature of the hot fluid. This may be 5,000 to 10,000 psi for molten metals and water.

A fluid-fluid self-mixing explosion is greatly feared in the situation where a nuclear fission reactor malfunctions, resulting in the melt-down of the reactor core. In the event of reactor malfunction, the neutron reactivity is shut down, but the fission product beta decays continue to emit heat at a rate of approximately 5% of fuel power. If the core is not cooled after the neutron reactivity is shut down, the core will melt.

Hence there are many back-up coolant systems, some of which are referred to as emergency cooling systems. If these should fail, then it would be possible for the core to melt into a pool of uranium oxide, fission products, fuel rod casing material — i.e., zirconium — and other stainless steel components. Upon melting of the tube sheet that supports the core, the molten mixture would fall into the remaining coolant which forms a residual coolant bath at the bottom of the reactor vessel, resulting in a fluid-fluid self-mixing explosion. It is quite possible that the explosion could be equivalent to roughly 1 ton of a normal high-explosive, a size sufficient to damage the reactor vessel or exterior safety containment structure.

SUMMARY OF THE INVENTION

There is provided, in accordance with the present invention, a way of greatly reducing the chance of an explosion in the event of a core melt-down by avoiding fluid-fluid explosive self-mixing of a molten mixture and the residual coolant bath. According to the invention, a gasifying agent is added to the fuel, the gasifying agent being passive at normal operating temperatures of the reactor. However, at a predetermined elevated temperature, say about 500° C, which is less than the melting temperature of the fuel, the gasifying agent releases inert gas of an amount sufficient to pulverize the fuel, rapture the bottom of the fuel rod; and blow the pulverized fuel into the residual coolant bath in the reactor vessel. The gasifying agent should have a low neutron capture cross-section so that nuclear reactivity of the fuel is unaffected.

To ensure that pulverized fuel is blown out the bottom of the fuel rod into the residual coolant bath, a blow-out plug is provided in the bottom of the fuel rod. A cooling coil in the residual coolant removes the heat so that the residual coolant does not boil off.

Among the gasifying agents suitable for addition to the nuclear fuel are the following:

carbon particles incorporated with a low-binding energy oxide, such as iron oxide ($Fe_3O_4$) and cuprous oxide ($Cu_2O$), the carbon particles reducing the oxide to form carbon dioxide ($CO_2$) gas when an elevated temperature is reached;

microspheres of a suitable material — e.g., aluminum or quartz — filled with high-pressure helium, the microspheres rupturing at an elevated temperature; and a hydrate that decomposes at an elevated temperature and releases several molecules of water per molecule of hydrate, for example, magnesium carbonate trihydrate ($MgCO_3 \cdot 3H_2O$) which decomposes at a temperature of between 500° C to 650° C to form one molecule of carbon dioxide ($CO_2$) gas, three molecules of water ($3H_2O$) vapor and one molecule of magnesium oxide (MgO).

BRIEF DESCRIPTION OF THE DRAWING

For a better understanding of the invention, reference may be made to the following description of an exemplary embodiment, taken in conjunction with the single FIGURE of the accompanying drawing which is a schematic cross-sectional view of a nuclear reactor.

DESCRIPTION OF THE EMBODIMENT

A typical nuclear reactor has a core 10 contained within a vessel 12 and made up of fuel rods 14 which are mounted vertically between the tube sheets 16 and 18. Each fuel rod 14 consists of a nuclear fuel, for example, uranium oxide, contained in a casing 20. Coolant is circulated from an inlet 23 through the core 10 and out an outlet 26.

The drawing depicts a possible result of a reactor malfunction in which circulation of the coolant has terminated and emergency cooling systems have failed, leaving a residual coolant bath 28 in the bottom of the vessel 12 below the core 10. Since a vapor barrier prevents the residual coolant bath 28 from reaching the fuel rods 14, the core 10 would melt-down causing a fluid-fluid self-mixing explosion when the molten mixture falls into the residual coolant bath 28. The present invention eliminates this possibility by making the fuel reach the residual coolant bath 28 before a melt-down temperature is reached.

In particular, a gasifying agent is added to the fuel, the gasifying agent being passive at normal operating temperatures of the core. However, at a predetermined elevated temperature less than the melting temperature of the fuel the gasifying agent gasifies and release an inert gas of an amount sufficient to pulverize the fuel, rupture the bottom of the fuel rods 14, and blow the pulverized fuel into the residual coolant bath 28, thereby avoiding melt-down of the core 10. The amount of gasifying agent which is needed to achieve these results can be calculated mathematically. For instance, if the rupture pressure($P_r$) is high, say 100 atomospheres, so that rupture would not occur during normal operating conditions, the required gas density would be $P_r(I_o/I_r)$ larger than atmospheric density, where $T_o$ is the normal operating temperature and $T_r$ is the rupture temperature. Assuming $T_o = 278°$ C, $T_r = 778°$ C, and $P_r = 100$ atmospheres, the required gas density would be approximately 30 times atmospheric or roughly 1/30 of the solid density. Therefore, the volume fraction of gasifying agent would be about 3% of the fuel volume, or slightly larger because fuel loading is actually less than 100% solid density to allow for fission product gas and expansion. Besides being passive at normal operating temperatures and releasing an inert gas at an elevated temperature, the gasifying agent should also have a low neutron capture cross-section so that nuclear reactivity of the fuel is substantially unaffected.

Inasmuch as the fuel rods 14 reach the predetermined elevated temperature at different times, the ejection of hot pulverized fuel into the residual coolant bath 28 takes place over a finite interval of time, seconds to minutes, which allows the continuous boiling of the coolant in the residual coolant bath 28 to remove the heat supplied by the pulverized fuel without causing a·fluid-fluid self-mixing explosion. To ensure that the pulverized fuel is blown out the bottom of the fuel rods 14 into the residual coolant bath 28 rather than out of the top of the fuel rods 14, the bottom of each casing 20 is closed by a blowout plug 24.

If the residual coolant bath 28 in the bottom of the vessel 12 is designed to hold a sufficient quantity of coolant, even in the event of a rupture in the suction line system, then the residual coolant bath 28 will remove heat from the pulverized fuel until additional coolant is added. As an additional back-up so that more coolant need not be added to the residual coolant bath 28, subsidiary coolant may be circulated through a cooling coil 30 in the residual coolant bath 28 so that the heat supplied by the pulverized fuel is removed without boiling away the coolant in the residual coolant bath 28.

Many different gasifying agents possess the properties discussed above, and may therefore be added to the nuclear fuel in accordance with the invention. For example, the gasifying agent may include carbon particles incorporated with a low-binding energy oxide, such as iron oxide ($Fe_3O_4$) and cuprous oxide ($Cu_2O$). The carbon particles reduce the oxide to form carbon dioxide ($CO_2$) gas when a temperature of about 500° C is reached. Microspheres of aluminum or quartz filled with high-pressure helium — e.g., 100 to 200 atmospheres — may also be used as the gasifying agent. The thickness of the microspheres and the volume of the helium are designed so that the mirospheres will rupture at an elevated temperature, say about 500° C, due to the melting of the microspheres and the increasing gas pressure of the helium. Another suitable gasifying agent is a hydrate that decomposes at an elevated temperature and releases several molecules of water per molecule of hydrate. For example, magnesium carbonate trihydrate ($MgCO_3·3 H_2O$) is a hydrate having a low neutron capture crosssection which decomposes at a temperature of between 500° C to 650° C to form one molecule of carbon dioxide ($CO_2$) gas, three molecules of water ($H_2O$) vapor, and one molecule of magnesium oxide (MgO).

Each gasifying agent has various advantages and disadvantages. However, it is evident that many chemical and physical systems can be devised to gasify at a predetermined temperature, pulverizing the nuclear fuel and blowing the pulverized fuel into a residual coolant bath, thereby avoiding a destructive fluid-fluid self-mixing explosion resulting from a core melt-down.

I claim:

1. In a liquid cooled nuclear reactor having a vessel, and a multiplicity of fuel rods having fissionable fuel contained in an enclosing jacket mounted in the core, and a residual liquid coolant bath in the vessel located essentially below the core in the bottom of the vessel, said fuel rod jackets having a blow-out means disposed to release the fuel rod contents into said residual coolant bath when a blow-out pressure is reached, the improvement comprising a gasifying agent in the fuel rods, the gasifying agent being passive at normal operating temperatures of the core and generating an inert gas at a predetermined elevated temperature between said operating temperatures and the melting temperature of the fuel rod, the agent being in an amount in relation to the blow-out plug and so disposed relative to the fuel in said fuel rod that upon gasifying it will release a gas volume sufficient to rupture said blow-out means, and expel the fuel from the fuel rods into the residual coolant bath to prevent melt-down of the core, whereby fluid-fluid explosive self-mixing of a molten mixture of fuel rod contents and the residual coolant bath is avoided.

2. A nuclear reactor according to claim 1, wherein the bottom of each fuel rod is closed by a blow-out plug constructed to ensure that the pulverized fuel is blown out the bottom of the fuel rods into the residual coolant bath rather than out of the top of the fuel rods.

3. A nuclear reactor according to claim 1, and further comprising cooling means in the residual coolant bath for removing heat supplied by the pulverized fuel from the coolant bath and preventing the residual coolant bath from boiling away.

4. A nuclear reactor according to claim 1, wherein the gasifying agent gasifies at a temperature of approximately 500° C.

5. A nuclear reactor according to claim 1, wherein the gasifying agent has a low neutron capture cross-section so that nuclear reactivity of the fuel is substantially unaffected.

6. A nuclear reactor according to claim 1, wherein the gasifying agent includes carbon particles incorporated with a low-binding energy oxide.

7. A nuclear reactor according to claim 6, wherein the low-binding energy oxide is selected from the group consisting of iron oxide and cuprous oxide.

8. A nuclear reactor according to claim 1, wherein the gasifying agent includes a microsphere filled with high-pressure helium, the thickness of the microsphere and the volume of the helium being such that the microsphere will rupture at the elevated temperature due to the melting of the microsphere and increasing gas pressure of the helium.

9. A nuclear reactor according to claim 8, wherein the helium is at a pressure of between 100 to 200 atmospheres.

10. A nuclear reactor according to claim 8, wherein the microsphere is aluminum.

11. A nuclear reactor according to claim 8, wherein the microsphere is quartz.

12. A nuclear reactor according to claim 1, wherein the gasifying agent is a hydrate capable of decomposing at the elevated temperature and releasing several molecules of water per molecule of hydrate.

13. A nuclear reactor according to claim 11, wherein the hydrate is magnesium carbonate trihydrate.

14. A nuclear reactor according to claim 1, wherein the fuel is uranium oxide.

15. In a liquid cooled nuclear reactor comprising a vessel, a core in the vessel, a multiplicity of fuel rods mounted in the core, a residual liquid coolant bath in the vessel located essentially below the core in the bottom of the vessel and cooling means in the residual coolant bath for preventing the boiling away of the residual coolant bath, each of said fuel rods comprising a pulverizable fissionable fuel sealed within a tubular casing having sealing means at each end thereof and a blow-out plug disposed to release the fuel rod contents into said residual cooling bath when a blow-out pressure is reached, the improvement comprising a gasifying agent in the fuel rods, the gasifying agent being passive at normal operating temperatures of the core and generating an inert gas at a pre-determined temperature between the operating temperature of the core and the melting temperature of the fuel rod, the agent being an amount in relation to the blow-out plug and so disposed relative to the fuel that when a hot fuel rod reaches said pre-determined elevated temperature said agent will release a gas volume sufficient to pulverize the fuel, eject the blow-out plug from the bottom of said hot fuel rod and blow the pulverized fuel into the residual coolant bath prior to melt-down of said hot fuel rod, whereby fluid-fluid explosive intermixing of a molten mixture of fuel rod contents and the residual coolant bath is avoided.

* * * * *

UNITED STATES PATENT AND TRADEMARK OFFICE
CERTIFICATE OF CORRECTION

PATENT NO. : 4,028,179
DATED : June 7, 1977
INVENTOR(S) : Stirling A. Colgate

It is certified that error appears in the above—identified patent and that said Letters Patent are hereby corrected as shown below:

Col. 2, line 6, "rapture" should be --rupture--.
Col. 2, line 67, "release" should be --releases--.
Col. 3, line 7, "atomospheres" should be --atmospheres--.
Col. 3, line 9, "$P_r(I_o/I_r)$" should be --$P_r(T_o/T_r)$--.
Col. 3, line 60, "mirospheres" should be --microspheres--.
Col. 4, lines 13 and 14, claim 1, between "vessel," and "and", insert --a core in the vessel,--.
Col. 4, line 64, claim 8, insert --the-- between "and" and "increasing".

Signed and Sealed this thirtieth Day of August 1977

[SEAL]

Attest:

RUTH C. MASON
Attesting Officer

C. MARSHALL DANN
Commissioner of Patents and Trademarks